United States Patent
Sterzing et al.

(10) Patent No.: US 9,043,254 B2
(45) Date of Patent: May 26, 2015

(54) METHOD FOR COMPUTER-AIDED CLOSED-LOOP AND/OR OPEN-LOOP CONTROL OF A TECHNICAL SYSTEM

(75) Inventors: Volkmar Sterzing, Neubiberg (DE); Steffen Udluft, Eichenau (DE); Jatinder Singh, Orlando, FL (US); Hans-Gerd Brummel, Berlin (DE); Glenn E. Sancewich, Cocoa, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 340 days.

(21) Appl. No.: 13/640,105

(22) PCT Filed: Apr. 12, 2010

(86) PCT No.: PCT/US2010/030693
§ 371 (c)(1),
(2), (4) Date: Dec. 19, 2012

(87) PCT Pub. No.: WO2011/129805
PCT Pub. Date: Oct. 20, 2011

(65) Prior Publication Data
US 2013/0204812 A1    Aug. 8, 2013

(51) Int. Cl.
*G06N 3/02* (2006.01)
*G06F 7/60* (2006.01)
(Continued)

(52) U.S. Cl.
CPC ............ *G06N 99/005* (2013.01); *G05B 13/048* (2013.01); *G05B 2219/33032* (2013.01); *G05B 2219/34082* (2013.01); *G05B 2219/42152* (2013.01)

(58) Field of Classification Search
None
See application file for complete search history.

(56) References Cited

U.S. PATENT DOCUMENTS

| 6,473,658 | B1 | 10/2002 | Broese |
| 2007/0088534 | A1* | 4/2007 | MacArthur et al. ............. 703/17 |
| 2008/0091390 | A1* | 4/2008 | Samardzija et al. ............. 703/2 |

FOREIGN PATENT DOCUMENTS

| DE | 10345440 A1 | 5/2005 |
| DE | 102007001026 B4 | 9/2008 |
| DE | 102007001024 B4 | 10/2008 |

(Continued)

OTHER PUBLICATIONS

A. M. Schaefer and S. Udluft: "Solving Partially Observable Reinforcement Learning Problems with Recurrent Neural Networks", Proceedings of the European Conference on Machine Learning (2005); Others.

(Continued)

*Primary Examiner* — Alan Chen

(57) ABSTRACT

A method for computer-aided closed and/or open-loop control of a technical system is provided. A first value of an output quantity is predicted on a data-based model at a current point in time. A second value of the output quantity is determined from an analytical model. The state of the technical system at the current point is assigned a confidence score in the correctness of prediction of the data-based model. A third value of the output quantity is determined from the first and second value as a function of the confidence score for controlling the technical system. A suitable value for the output quantity can be derived from the analytical model even for regions of the technical system in which the quality of prediction of the data-based model is low because of a small set of training data. The technical systems can be turbines, such as gas turbines.

23 Claims, 1 Drawing Sheet

(51) Int. Cl.
*G06N 99/00* (2010.01)
*G05B 13/04* (2006.01)

(56) References Cited

FOREIGN PATENT DOCUMENTS

| | | | |
|---|---|---|---|
| DE | 102007001025 | B4 | 11/2008 |
| DE | 102007042440 | B3 | 1/2009 |
| DE | 102007017259 | B4 | 4/2009 |
| DE | 102008007700 | A1 | 5/2009 |
| DE | 102008020379 | A1 | 10/2009 |
| DE | 102008020380 | A1 | 12/2009 |

OTHER PUBLICATIONS

B. Lang et al.: "Neural clouds for monitoring of complex systems", Optical Memory & Neural Networks, vol. 17, Nummer 3 (2008), Seiten 183 bis 192; Others.
Quadrado, J.C.; Others; 2004; PT.
ICASSP-97, Munich, DE; Apr. 21-24, 1997, Los Alamitos, CA, USA, IEEE Comput. Soc.; US LNKD-DOI:10.1109/ICASSP.1997. 599582, vol. 1, Apr. 21, 1997 (pp. 155-158) ISBN: 978-0-8186-7919-3; p. 157-158, figure 6; Others; 1997; DE.
Shi-Jie Dai, et al.; ISBN: 978-0-7803-7508-6; the whole document;; Others; US.
Ben Aoun S., et al.; Others; 2008; US.

* cited by examiner

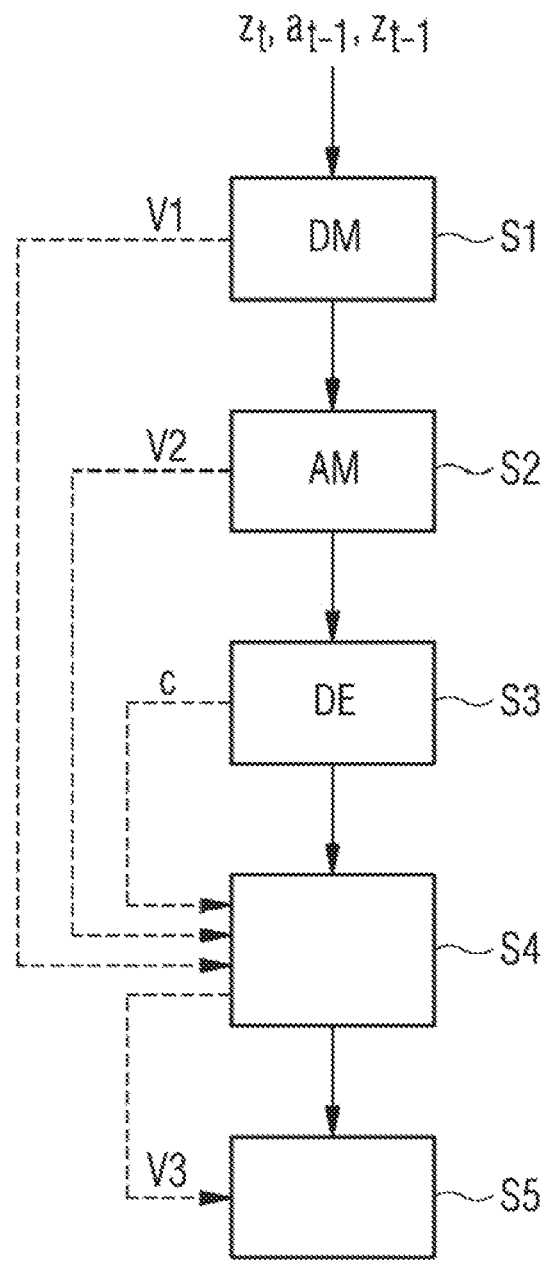

METHOD FOR COMPUTER-AIDED CLOSED-LOOP AND/OR OPEN-LOOP CONTROL OF A TECHNICAL SYSTEM

CROSS REFERENCE TO RELATED APPLICATIONS

This application is the US National Stage of International Application No. PCT/US2010/030693, filed Apr. 12, 2010 and claims the benefit thereof. The PCT application is incorporated by reference herein in its entirety.

FIELD OF THE INVENTION

The invention relates to a method for computer-aided closed- and/or open-loop control of a technical system and to a corresponding computer program product.

BACKGROUND OF THE INVENTION

Various computer-aided methods with which a technical system can be controlled in an appropriate manner are known from the prior art. On the one hand, data-based methods exist which learn appropriate control of the technical system on the basis of training data in the form of known states of the technical system and actions executed in the known states. Such data-based methods are described in publications [1] to [10]. Here neural models are used, based in particular on recurrent neural networks, to model the dynamic behavior of the technical system and the relationships between different action or state variables. With these methods, an optimal rule with regard to reward is learned which, based on the current state of the system, taking past states into account, defines an optimal action for the system in the current state.

The disadvantage of data-based methods is that that good open- or closed-loop control of a technical system is only guaranteed when the technical system is operating in a region of the state space of the possible states of the technical system that is within the region of the training data used for learning the method. There is therefore a need to extend data-based methods such that they also provide suitable open- or closed loop control for regions in the state space of the technical system that are outside the training data.

SUMMARY OF THE INVENTION

The object of the invention is therefore to create a method for computer-aided closed- or open-loop control of a technical system which provides good results in large regions of the state space of the possible states of the technical system.

This object is achieved by the method and the computer program product as claimed in the independent claims. Developments of the invention are defined in the dependent claims.

The method according to the invention is used for computer-aided closed- or open-loop control of a technical system which is described for a plurality of points in time by a state with a number of state variables and an action executed in that state, said action comprising a number of action variables. In the method, on the basis of a data-based model which is learned using training data from known states and actions of the technical system, there is predicted, at a current point in time, from the state of the technical system at said current point in time, a first value for an output quantity with a number of output variables characterizing the technical system. Said data-based model is based on learning the behavior of the technical system from known states and actions, it being possible for any data-based models to be used in the method according to the invention. In particular, data-based models described in the above-mentioned publications [1] to [10] can be used. The entire disclosure content of said publications [1] to [10] and of publication [11] cited below is incorporated by reference in the content of the present application.

The technical system in question can be anything, e.g. it can be a turbine, particularly in the form of a gas turbine or wind turbine. The state variables of the states of the technical system are any parameters of the system, in particular in the form of physical measured quantities such as pressure, temperature and the like. The action variables of the actions of the technical system are in particular manipulated variables set or changed on the technical system which result in a subsequent state of the technical system. An action may in some cases also consist in that no change is made to action variables. The output variables can likewise be any parameters of the technical system, particularly also states of the technical system or actions executed on the technical system.

In the method according to the invention, in addition to a data-based model, an analytical model is used which describes the behavior of the technical system analytically. Said analytical description is understood as meaning the specification of the technical system on the basis of suitable formulas, e.g. the physical description of the technical system in the form of corresponding equations or corresponding models, e.g. on the basis of a thermodynamic model. Based on such an analytical model, in a similar manner to the data-based model, a second value for the output quantity is predicted from the state of the technical system at the current point in time. Said second value need not necessarily be derived directly from the analytical model using formulas. If required, the analytical model can also be represented by a neural network which has learned the corresponding formulas for describing the technical system.

In the method according to the invention, the state of the technical system at the current point in time is assigned a confidence score which describes confidence in the correctness of the prediction of the data-based model for the state of the technical system at the current point in time. Any prior art methods can be used to determine a suitable confidence score of this kind. In a particularly preferred embodiment, a data density based model is used which takes into account the state density of past states of the technical system. In particular, the model described in publication [11] is used which, on the basis of past states of a technical system, determines a suitable confidence value for a newly emerging state of the technical system from radial basis functions with the aid of a neural network. However, other classification methods known from the prior art for evaluating a new state of a technical system can also be used. For example, fuzzy models can be used which, via suitably defined fuzzy membership functions, specify regions in the state space in which the prediction of a data-based model is more trusted than in other regions.

Finally in the method according to the invention, by means of the confidence score determined for the data-based model, a third value for the output quantity is determined which takes into account the first and second value for the output quantity as a function of the confidence score, the first value being taken more heavily into account in the third value the higher the confidence according to the confidence score. The technical system is then controlled in an open- and/or closed-loop manner taking the third value into account.

The method according to the invention is based on the recognition that, in certain regions of the state space of the technical system, the output quantities of a data-based model are subject to a high degree of uncertainty. In these regions an analytical model is additionally used which, although it provides less accurate results in regions of the state space that were learned using the data-based model, is nevertheless more accurate in regions of the state space that have not yet been learned previously. The two models can be suitably combined via a confidence score, thereby yielding good results for controlling the technical system in the entire space of the possible states of the system.

In a particularly preferred embodiment, a weighted value from the first value and the second value is determined as a third value for the output quantity, the first value being more heavily weighted in the third value the greater the confidence according to the confidence score. The determining of the third value can also be organized differently if required. For example, a minimum confidence can be defined for the confidence score, the first value always being used as the third value if the confidence score is above the minimum confidence, and, if not, the second value is determined as the third value.

In another variant of the method according to the invention, the confidence score and the first and/or second and/or third value are output for the output quantity. These output quantities provide important diagnostic information in respect of the current state of the system. For example, a corresponding user can stop the operation of the technical system if he finds that the confidence is very low, as in this case sufficient accuracy for controlling the technical system is no longer guaranteed.

In another variant of the method according to the invention, the output quantity comprises the following quantity:
- at least some of the state variables of a subsequent state of the technical system resulting from the state of the technical system at the current point in time and caused by the execution of an action; and/or
- at least some of the action variables of the action to be executed in the state of the technical system at the current point in time.

These types of output quantities are used particularly if the data-based model constitutes a learned action selection rule which determines an action to be executed at the current point in time as a function of the state of the technical system at the current point in time and, in particular, taking states and actions at one or more past points in time into account. The learning of such action selection rules is sufficiently known from the prior art and is based, for example, on the use of a so-called Q-function, i.e. modeling of the technical system via recurrent neural networks. Corresponding methods for learning the action selection rules are described in the above-mentioned publications [1] to [10].

In another particularly preferred embodiment, the data-based model is not only used to predict output quantities, but the technical system is also closed- and/or open-loop controlled on the basis of said data-based model.

In another particularly preferred embodiment of the method according to the invention, the data-based model is continuously learned with the newly emerging states of the technical system while the method is being carried out. This ensures constant improvement of the prediction on the basis of the data-based model during closed- or open-loop control of the technical system.

As already mentioned, the above-described confidence score can be determined using any methods. In particular, a learning model such as a data density based learning model or a learning fuzzy model can be used to determine the confidence score. This learning model is continuously learned with the newly emerging states of the technical system while the method is being carried out, so that the value of the confidence score also becomes increasingly accurate.

The confidence score according to the invention can be determined in any manner. It merely has to be ensured that the confidence score reflects the confidence in the correctness of the prediction of the data-based model. In a variant of the method according to the invention, the confidence score is represented by a value between 0 and 1, the value 1 constituting maximum confidence and the third value for the output quantity being determined, in particular, as the sum of the first value, multiplied by the confidence score, and the second value, multiplied by the difference between 1 and the confidence score.

In addition to the above-described method, the invention also relates to a computer program product with a program code stored on a machine-readable medium for carrying out the method according to the invention when the program is run on a computer.

BRIEF DESCRIPTION OF THE DRAWINGS

An exemplary embodiment of the invention will now be described in detail with reference to the accompanying FIGURE. This shows a flowchart schematically illustrating the steps executed in an exemplary embodiment of the method according to the invention.

DETAILED DESCRIPTION OF THE INVENTION

The embodiment described below of the method according to the invention relates to the closed- or open-loop control of a technical system, based on a suitable combination of a data-based model and an analytical model. For a plurality of points in time, the technical system is described in each case by a state with a number of state variables and an action executed in that state, said action comprising a number of action variables. Said data-based model of the technical system is learned using training data from known states and actions of the technical system and learning proceeds continuously during the execution of the method. Any methods known from the prior art, preferably the methods described in the above-mentioned documents [1] to [10], can be used as the data-based model to describe the technical system.

As shown in FIGURE, the data-based model DM contains, as inputs, a corresponding state $z_t$ of the technical system as well as past states and actions executed on the technical system, the past states generally being denoted by $z_{t-1}$ and the past actions generally by $a_{t-1}$. Said states and actions constitute corresponding vectors with a plurality of entries which describe particular state variables of the technical system and particular action variables of actions executed on the technical system respectively. In step S1 of the method, using the data-based model DM, there is determined from the current state $z_t$ of the technical system as well as past states $z_{t-1}$ and actions $a_{t-1}$ the value of an output quantity which is denoted by V1 in FIGURE and constitutes a prediction of a number of output variables characterizing the technical system.

For example, with the data-based model DM, on the basis of a corresponding reward function, an action selection rule can be learned which, depending on the current state of the technical system and, in particular, taking states and actions from the past into account, specifies the action to be carried out next that is optimal in terms of reward. In this case, the data-based model DM acts as a learning controller for the technical system. It must be taken into account here that the prediction of the data-based model becomes increasingly poor the farther new states of the technical system are from the states with which the data-based model DM was learned. It is therefore desirable to assess the data-based model based output of this model to determine the extent to which the prediction of the output quantity can be trusted. In particular, in the event that it is likely that the value V1 of the output quantity of the data-based model is subject to error, the corresponding output quantity is corrected appropriately.

To achieve this, in the method according to the invention the data-based model is linked in a suitable manner to an analytical model. Said analytical model is denoted by AM in FIGURE. In a step S2 of the method of FIGURE, a second value V2 of the same output quantity as in step S1 is now determined on the basis of the analytical model AM. In general, an analytical model describes the behavior of the technical system on the basis of suitable analytical modeling in the form of corresponding equations using predefined model assumptions. The second value V2 of the analytical model need not be determined directly via corresponding formulas or equations of the analytical model, but it is also possible, if required, for the second value to be generated via a neural network which has been learned on the basis of the analytical model.

The analytical model can be a thermodynamic model for describing the thermodynamic behavior of a technical system. For example, the temperature in the combustion chamber of a gas turbine can be predicted on the basis of such a thermodynamic model, taking corresponding input variables in the form of state variables of the technical system into account. Using the analytical model, a change in a manipulated variable on the technical system, representing an action to be carried out on the technical system, can also be modeled if required.

Although an analytical model supplies more reliable results than a data-based model in a region of the state space of the possible states of the technical system that is far removed from states of the technical system according to the training data (usually normal operating states of the technical system), the analytical model is less accurate than the data-based model in regions of the state space in which the data-based model was learned. The object now is, depending on the region of the state space in which the output quantities are calculated, to establish a suitable weighting between data-based and analytical model. In the embodiment described here, such a weighting is determined in a data density based manner, a suitable data encapsulator DE being used for this purpose which evaluates the density of the states of the technical system assumed in the past and, on the basis thereof, derives a confidence value for the current state of the technical system in the form of a probability value. Said data encapsulator is trained using training data. In the embodiment of the invention described here, said training of the data encapsulator is performed continuously with the newly emerging states of the technical system.

In a particularly preferred embodiment, the method described in publication [11] is used as a data encapsulator. This method determines a confidence value of a new data point on the basis of past states of a technical system using a neural network based on radial basis functions. Said data encapsulator has already been successfully tested for vibration data to differentiate between normal operating conditions used during training and critical and abnormal operating conditions of a technical system.

Instead of the data encapsulator described in publication [11], any other methods can also be used to derive in a suitable manner, a confidence value which specifies, for the data-based model, the extent to which the prediction calculated can be trusted. For example, methods based on fuzzy logic can also be used. Here available knowledge concerning the state space is given in the form of fuzzy membership functions and can be used to specify the regions in the state space in terms of whether the data-based model is to be preferred over the analytical model. Using neuro-fuzzy combinations, this knowledge can be adapted, extracted and analyzed for use as part of the method according to the invention.

In the method as shown in FIGURE, a corresponding confidence value c for the current state in the state space of the technical system is determined in step S3 using the above-mentioned data encapsulator DE, said confidence value c being between 0 and 1 in the embodiment described here. The larger the confidence value, the greater the confidence in the reliability of the prediction based on the data-based model DM. The corresponding weighting between the first value V1 of the output quantity of the data-based model DM and the second value V2 of the output quantity of the analytical model AM finally takes place in step S4, the confidence value c calculated in step S3 being used for the weighting.

In a preferred variant, a third output quantity V3 is calculated as follows from the first value V1 and the second value V2 of the output quantity:

$$V3 = c*V1 + (1-c)*V2$$

In this way, the first value of the data-based model and the second value of the analytical model are weighted such that the first value V1 of the data-based model is taken more heavily into account in the third value V3 the greater the confidence according to the confidence value c. The weighting between data-based and analytical model can also be organized differently if required, the crucial factor merely being that a higher confidence in the correctness of the prediction of the data-based model according to the confidence score results in a heavier weight in the third value V3 toward the first value V1.

After generation of the output value V3, in step S5 the technical system is finally controlled on the basis of said output value. For example, the output value can be an action to be carried out in the current state of the technical system, e.g. the changing of a manipulated variable of the technical system. In step S5 the corresponding action is then executed based on the value V3. As already explained above, both the data-based model and the data encapsulator are learned during the course of the method. In other words, as soon as a new current state is assumed in the technical system, these two models are re-trained in order to extend thereby the data encapsulator and the data-based model.

In the method according to the invention, in particular a data-based model is used which, by suitably taking into account the history of past (observed) states, approximates the so-called Markov property. For said approximation of a Markov state, a state estimator based on a neural network or more specifically a recurrent neural network is used, such state estimators being known from the prior art. A state estimator from one of the above-mentioned publications [1] to [10] is preferably used. For example, in publication [10] a state estimator for a technical system is described which uses a recurrent neural network which is trained with error back-propagation through time, which is a shared weights based extension of per se known standard backpropagation.

The method according to the invention can be used for closed- or open-loop control of any technical systems. One application is control of a turbine and in particular a gas turbine. Here, for example, the distribution of fuel flows in a gas turbine can be controlled and optimized as a function of a suitably defined reward using the method according to the invention. The states or rather changed manipulated variables of said gas turbine or more specifically corresponding output quantities can include, for example, fuel parameters in the combustion process of the gas turbine, such as the fuel composition, performance parameters of the gas turbine or other turbine parameters. The correspondingly defined reward can be selected such that an optimization objective in respect of reducing the emissions or increasing the efficiency of the gas turbine is modeled thereby.

The above-described method according to the invention has a number of advantages. In particular, an ideal combination of existing knowledge from an analytical model and a suitable data approximation based on a data-based model, such as a neural network, is achieved. The corresponding output adapts itself appropriately, as a function of the states occurring, to variations or rather modifications of the technical system. At the start of the method, i.e. when few states of the technical system are, as yet, available for learning the data-based model, the corresponding third value of the output quantity is determined to the greatest extent by the analytical model, whereas after longer operation of the technical system, because of the increasing number of known states, the data-based model is given increasing weight for calculating the third value of the output quantity. By continuously analyzing the differences between the analytical model and the data-based model, valuable diagnostic information is additionally obtained.

On the basis of corresponding methods which determine a confidence value for the data-based model, in particularly on the basis of a data density based model as described in publication [11], for example, a clear separation can be made between regions in the state space which provide a very good prediction (high confidence value), and regions in which a rather inaccurate prediction is likely. For the latter regions, the third output value is then weighted toward the second value in accordance with the analytical model. In this way, suitable open- or closed-loop control of a technical system is created by the method according to the invention using a state estimator which determines the quality of the prediction of an output quantity for the data-based model and corrects the output quantity in an appropriate manner on the basis of an analytical model.

LIST OF REFERENCES

[1] DE 10 2007 001 024 B4
[2] DE 103 45 440 A1
[3] DE 10 2007 001 025 B4
[4] DE 10 2007 001 026 B4
[5] DE 10 2007 017 259 B4
[6] DE 10 2007 042 440 B3
[7] DE 10 2008 007 700 A1
[8] DE 10 2008 020 380 A1
[9] DE 10 2008 020 379 A1
[10] A. M. Schaefer and S. Udluft: "Solving Partially Observable Reinforcement Learning Problems with Recurrent Neural Networks", Proceedings of the European Conference on Machine Learning (2005)
[11] B. Lang et al.: "Neural clouds for monitoring of complex systems", Optical Memory & Neural Networks, Volume 17, Number 3 (2008), Pages 183 to 192

The invention claimed is:

1. A method for computer-aided controlling a technical system, wherein the technical system is described with a plurality of points in time by a state comprising a plurality of state variables and an action comprising a plurality of action variables to be executed in the state, the method comprising:

predicting a first value for an output quantity having a plurality of output variables of the technical system from a state at a current point in time based on a data-based model, wherein the data-based model is learned with training data from known states and actions of the technical system;

predicting a second value for the output quantity from the state at the current point in time based on an analytical model, wherein the analytical model analytically describes a behavior of the technical system;

allocating a confidence score to the state of the technical system at the current point in time, wherein the confidence score describes a confidence in correctness of the prediction of the data-based model for the state of the technical system at the current point in time;

determining a third value for the output quantity from the first and the second value for the output quantity as a function of the confidence score, wherein the first value is weighted greater in determining the third value if a confidence is higher in the confidence score; and controlling the technical system using the third value, wherein the data-based model comprises a learned action selection rule which determines an action to be executed at the current point in time as a function of the state of the technical system at the current point in time.

2. The method as claimed in claim 1, wherein states and actions of the technical system at one or more past points in time are considered in determining the action to be executed at the current point in time.

3. A method for computer-aided controlling a technical system, wherein the technical system is described with a plurality of points in time by a state comprising a plurality of state variables and an action comprising a plurality of action variables to be executed in the state, the method comprising:

predicting a first value for an output quantity having a plurality of output variables of the technical system from a state at a current point in time based on a data-based model, wherein the data-based model is learned with training data from known states and actions of the technical system;

predicting a second value for the output quantity from the state at the current point in time based on an analytical model, wherein the analytical model analytically describes a behavior of the technical system;

allocating a confidence score to the state of the technical system at the current point in time, wherein the confidence score describes a confidence in correctness of the prediction of the data-based model for the state of the technical system at the current point in time;

determining a third value for the output quantity from the first and the second value for the output quantity as a function of the confidence score, wherein the first value is weighted greater in determining the third value if a confidence is higher in the confidence score; and controlling the technical system using the third value, wherein the data-based model comprises a recurrent neural network.

4. A method for computer-aided controlling a technical system, wherein the technical system is described with a plurality of points in time by a state comprising a plurality of state variables and an action comprising a plurality of action variables to be executed in the state, the method comprising:

predicting a first value for an output quantity having a plurality of output variables of the technical system from a state at a current point in time based on a data-based model, wherein the data-based model is learned with training data from known states and actions of the technical system;
predicting a second value for the output quantity from the state at the current point in time based on an analytical model, wherein the analytical model analytically describes a behavior of the technical system;
allocating a confidence score to the state of the technical system at the current point in time, wherein the confidence score describes a confidence in correctness of the prediction of the data-based model for the state of the technical system at the current point in time;
determining a third value for the output quantity from the first and the second value for the output quantity as a function of the confidence score, wherein the first value is weighted greater in determining the third value if a confidence is higher in the confidence score; and
controlling the technical system using the third value,
wherein the confidence score is represented by a value between 0 and 1 with the value 1 representing maximum confidence, and wherein the third value is determined as a sum of the first value multiplied by the confidence score and the second value multiplied by a difference between 1 and the confidence score.

5. A method for computer-aided controlling a technical system, wherein the technical system is described with a plurality of points in time by a state comprising a plurality of state variables and an action comprising a plurality of action variables to be executed in the state, the method comprising:
predicting a first value for an output quantity having a plurality of output variables of the technical system from a state at a current point in time based on a data-based model, wherein the data-based model is learned with training data from known states and actions of the technical system;
predicting a second value for the output quantity from the state at the current point in time based on an analytical model, wherein the analytical model analytically describes a behavior of the technical system;
allocating a confidence score to the state of the technical system at the current point in time, wherein the confidence score describes a confidence in correctness of the prediction of the data-based model for the state of the technical system at the current point in time;
determining a third value for the output quantity from the first and the second value for the output quantity as a function of the confidence score, wherein the first value is weighted greater in determining the third value if a confidence is higher in the confidence score; and
controlling the technical system using the third value,
wherein the analytical model is learned based on a neural network.

6. The method as claimed in claim 5, wherein a weighted value is determined from the first and the second value in determining the third value, and wherein the weighting of the first value is greater if the confidence is higher in the confidence score.

7. The method as claimed in claim 5, wherein the confidence score and the first and/or the second and/or the third value are output for the output quantity.

8. The method as claimed in claim 5, wherein the output quantity comprises:
at least some of the state variables of a subsequent state of the technical system resulting from the state of the technical system at the current point in time due to an execution of an action; and/or
at least some of the action variables of the action to be executed in the state of the technical system at the current point in time.

9. The method as claimed in claim 5, wherein the technical system is closed and/or open-loop controlled based on the data-based model.

10. The method as claimed in claim 5, wherein the data-based model is continuously learned with a newly emerging state of the technical system.

11. The method as claimed in claim 5, wherein the confidence score is determined based on a data density model considering state density of past states of the technical system and/or is determined based on a fuzzy model.

12. The method as claimed in claim 5, wherein the confidence score is determined based on a learning model, and wherein the learning model is continuously learned with a newly emerging state of the technical system.

13. The method as claimed in claim 12, wherein the learning model comprises a learning data density model and/or a learning fuzzy model.

14. A method for computer-aided controlling a technical system, wherein the technical system is described with a plurality of points in time by a state comprising a plurality of state variables and an action comprising a plurality of action variables to be executed in the state, the method comprising:
predicting a first value for an output quantity having a plurality of output variables of the technical system from a state at a current point in time based on a data-based model, wherein the data-based model is learned with training data from known states and actions of the technical system;
predicting a second value for the output quantity from the state at the current point in time based on an analytical model, wherein the analytical model analytically describes a behavior of the technical system;
allocating a confidence score to the state of the technical system at the current point in time, wherein the confidence score describes a confidence in correctness of the prediction of the data-based model for the state of the technical system at the current point in time;
determining a third value for the output quantity from the first and the second value for the output quantity as a function of the confidence score, wherein the first value is weighted greater in determining the third value if a confidence is higher in the confidence score; and
controlling the technical system using the third value,
wherein the technical system comprises a turbine.

15. The method as claimed in claim 14, wherein the turbine comprises a gas turbine or a wind turbine.

16. The method as claimed in claim 14, wherein a weighted value is determined from the first and the second value in determining the third value, and wherein the weighting of the first value is greater if the confidence is higher in the confidence score.

17. The method as claimed in claim 14, wherein the confidence score and the first and/or the second and/or the third value are output for the output quantity.

18. The method as claimed in claim 14, wherein the output quantity comprises:
at least some of the state variables of a subsequent state of the technical system resulting from the state of the technical system at the current point in time due to an execution of an action; and/or
at least some of the action variables of the action to be executed in the state of the technical system at the current point in time.

19. The method as claimed in claim 14, wherein the technical system is closed and/or open-loop controlled based on the data-based model.

20. The method as claimed in claim 14, wherein the data-based model is continuously learned with a newly emerging state of the technical system.

21. The method as claimed in claim 14, wherein the confidence score is determined based on a data density model considering state density of past states of the technical system and/or is determined based on a fuzzy model.

22. The method as claimed in claim 14, wherein the confidence score is determined based on a learning model, and wherein the learning model is continuously learned with a newly emerging state of the technical system.

23. The method as claimed in claim 22, wherein the learning model comprises a learning data density model and/or a learning fuzzy model.

* * * * *